United States Patent
Um et al.

(10) Patent No.: US 12,066,724 B2
(45) Date of Patent: Aug. 20, 2024

(54) ARRAY SUBSTRATE AND DISPLAY DEVICE

(71) Applicant: TCL China Star Optoelectronics Technology Co., Ltd., Guangdong (CN)

(72) Inventors: Yoonsung Um, Guangdong (CN); Ji Li, Guangdong (CN); Xiaojin He, Guangdong (CN); Jingxin Fang, Guangdong (CN); Yun Yu, Guangdong (CN); Qi Zhang, Guangdong (CN); Lei Lin, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/765,456

(22) PCT Filed: Mar. 29, 2022

(86) PCT No.: PCT/CN2022/083726
§ 371 (c)(1),
(2) Date: Mar. 31, 2022

(87) PCT Pub. No.: WO2023/173483
PCT Pub. Date: Sep. 21, 2023

(65) Prior Publication Data
US 2024/0053643 A1     Feb. 15, 2024

(30) Foreign Application Priority Data
Mar. 16, 2022   (CN) ........................ 202210259582.X

(51) Int. Cl.
*G02F 1/1343*        (2006.01)
*G02F 1/1362*        (2006.01)

(52) U.S. Cl.
CPC .. *G02F 1/134372* (2021.01); *G02F 1/134309* (2013.01); *G02F 1/136286* (2013.01)

(58) Field of Classification Search
None
See application file for complete search history.

(56) References Cited

U.S. PATENT DOCUMENTS

2009/0160748 A1    6/2009  Kimura et al.
2021/0407354 A1*  12/2021  Zhang ............... G02F 1/134363

FOREIGN PATENT DOCUMENTS

CN     105652530      6/2016
CN     106338864      1/2017
(Continued)

OTHER PUBLICATIONS

Notification of Office Action and Search Report Dated Jun. 12, 2023 From the State Intellectual Property Office of the People's Republic of China Re. Application No. 202210259582.X and its Translation Into English. (20 Pages).

(Continued)

*Primary Examiner* — Phu Vu

(57) ABSTRACT

An array substrate and a display device are disclosed, the array substrate includes: a substrate; and a plurality of pixel units disposed on the substrate, each pixel unit including: a pixel electrode; a first common electrode disposed apart from the pixel electrode, an orthographic projection of the first common electrode on the substrate and an orthographic projection of the pixel electrode on the substrate at least partially overlap; and at least one second common electrode disposed in a layer in which the first common electrode is disposed, an orthographic projection of the second common electrode on the substrate and the orthographic projection of the pixel electrode on the substrate at least partially overlap; wherein the first common electrode and the second common electrodes are insulated from each other.

17 Claims, 10 Drawing Sheets

(56) References Cited

FOREIGN PATENT DOCUMENTS

| | | |
|---|---|---|
| CN | 107331364 | 11/2017 |
| CN | 107527924 | 12/2017 |
| CN | 108957875 | 12/2018 |
| CN | 109154749 | 1/2019 |
| CN | 109164655 | 1/2019 |
| CN | 111381411 | 7/2020 |
| JP | 2009-150925 | 7/2009 |
| JP | 2009-198831 | 9/2009 |
| JP | 2009-223167 | 10/2009 |
| JP | 2013-246250 | 12/2013 |
| JP | 2018-010229 | 1/2018 |

OTHER PUBLICATIONS

International Search Report and the Written Opinion Dated Nov. 30, 2022 From the International Searching Authority Re. Application No. PCT/CN2022/083726 and its Translation Into English. (17 Pages).

Notice of Reasons for Refusal Dated May 14, 2024 From the Japan Patent Office Re. Application No. 2022-520902 and Its Translation Into English. (10 Pages).

* cited by examiner

ARRAY SUBSTRATE AND DISPLAY DEVICE

RELATED APPLICATIONS

This application is a National Phase of PCT Patent Application No. PCT/CN2022/083726 having International filing date of Mar. 29, 2022, which claims the benefit of priority of China Patent Application No. 202210259582.X filed on Mar. 16, 2022. The contents of the above applications are all incorporated by reference as if fully set forth herein in their entirety.

FIELD AND BACKGROUND OF THE INVENTION

The present disclosure relates to the technical field of display, and specifically to an FFS (fringe-field switching) type array substrate and a display device.

With continuous improvement of information technology and living standards, people have higher and higher requirements for display quality such as color gamut.

For example, RGBW technology can increase display brightness of a liquid crystal display (LCD) and reduce LCD power consumption. However, challenge of adopting this mode is that purity and saturation of monochrome will be reduced, and fineness of the picture of the same resolution is not as good as that of an RGB screen. Improving the color gamut is critical in applications that require guaranteed picture finesse. Although some technologies have been proposed in the past, they still need to be improved.

SUMMARY OF THE INVENTION

The present disclosure provides an array substrate and a display device for improving color gamut of the display device.

To solve the above problem, an aspect of the present disclosure provides an array substrate, which includes: a substrate; a plurality of pixel units disposed on the substrate, wherein the plurality of pixel units are formed in a manner of intersecting a plurality of data lines with a plurality of scan lines, and each of the plurality of pixel units includes: a pixel electrode; a first common electrode disposed apart from the pixel electrode, wherein an orthographic projection of the first common electrode on the substrate at least partially overlaps an orthographic projection of the pixel electrode on the substrate; and at least one second common electrode disposed in a layer in which the first common electrode is disposed, wherein an orthographic projection of the second common electrode on the substrate at least partially overlaps the orthographic projection of the pixel electrode on the substrate; and a first common electrode line and a second common electrode line, wherein the first common electrode line is connected to the first common electrode, the second common electrode line is connected to the second common electrode, and the first common electrode line and the second common electrode line are configured to provide different signals; wherein the first common electrode and the second common electrode are insulated from each other.

According to an embodiment of the present disclosure, the number of the at least one second common electrode is two, and the two second common electrodes are arranged on two sides of the first common electrode in an extension direction of the data lines or an extension direction of the scan lines.

To solve the above problem, another aspect of the present disclosure provides an array substrate, which includes: a substrate; and a plurality of pixel units disposed on the substrate, wherein each of the pixel units includes: a pixel electrode; a first common electrode disposed apart from the pixel electrode, wherein an orthographic projection of the first common electrode on the substrate at least partially overlaps an orthographic projection of the pixel electrode on the substrate; and at least one second common electrode disposed in a layer in which the first common electrode is disposed, wherein an orthographic projection of the second common electrode on the substrate at least partially overlaps the orthographic projection of the pixel electrode on the substrate; wherein the first common electrode and the second common electrode are insulated from each other.

According to an embodiment of the present disclosure, the first and the second common electrodes are disposed between the pixel electrode and the substrate.

According to an embodiment of the present disclosure, the pixel electrode is disposed between the substrate and the first and second common electrodes.

According to an embodiment of the present disclosure, the first common electrode is formed into a mirror-symmetrical structure along a virtual plane perpendicular to the substrate, and the second common electrode is disposed outside the first common electrode.

According to an embodiment of the present disclosure, the plurality of pixel units are formed in a manner of intersecting a plurality of data lines with a plurality of scan lines, the number of the at least one second common electrodes is two, and the two second common electrodes are arranged on two sides of the first common electrode in an extension direction of the data lines.

According to an embodiment of the present disclosure, the two second common electrodes are formed into structures being mutually mirror-symmetrical along the virtual plane.

According to an embodiment of the present disclosure, the pixel electrode has a plurality of first branch electrodes arranged at intervals, a slit is formed between adjacent two of the first branch electrodes, and an angle between the virtual plane and an extension direction of a part of the first branch electrodes located on one side of the virtual plane is identical to an angle between the virtual plane and an extension direction of a part of the branch electrodes on the other side of the virtual plane.

According to an embodiment of the present disclosure, the pixel electrode further includes two first trunk electrodes, wherein one of the two first trunk electrodes is connected to one end of each of the plurality of first branch electrodes, and the other of the two first trunk electrodes is connected to the other end of each of the plurality of first branch electrodes.

According to an embodiment of the present disclosure, the pixel electrode further includes an extension electrode connected between one of the two first trunk electrodes and a control element.

According to an embodiment of the present disclosure, the plurality of first branch electrodes are arranged in a mirror symmetry manner on two opposite sides of the virtual plane.

According to an embodiment of the present disclosure, each of the first and second common electrodes is formed into a mirror-symmetrical structure along a virtual plane perpendicular to the substrate.

According to an embodiment of the present disclosure, the plurality of pixel units are formed in a manner of intersecting a plurality of data lines with a plurality of scan lines, the number of the at least one second common electrodes is two, and the two second common electrodes are arranged on two sides of the first common electrode in an extension direction of the scan lines.

According to an embodiment of the present disclosure, each of the first common electrode and the two second common electrodes has a plurality of second branch electrodes arranged at intervals, a slit is formed between adjacent two of the second branch electrodes, and an angle between the virtual plane and an extension direction of a part of the second branch electrodes located on one side of the virtual plane is identical to an angle between the virtual plane and an extension direction of a part of the branch electrodes on the other side of the virtual plane.

According to an embodiment of the present disclosure, each of the first common electrode and the two second common electrodes further includes two second trunk electrodes, one of the two second trunk electrodes of the first common electrode is connected to one end of each of the plurality of second branch electrodes of the first common electrode, the other of the two second trunk electrodes of the first common electrode is connected to the other end of each of the second branch electrodes of the first common electrode, one of the two second trunk electrodes of the second common electrode is connected to one end of each of the plurality of second branch electrodes of the second common electrode, and the other of the two second trunk electrodes of the second common electrode is connected to the other end of each of the second branch electrodes of the second common electrode.

According to an embodiment of the present disclosure, the pixel electrode is formed into a mirror-symmetric structure along the virtual plane.

According to an embodiment of the present disclosure, the array substrate further includes a first common electrode line and a second common electrode line, the first common electrode line is connected to the first common electrode, the second common electrode line is connected to the second common electrode, and the first common electrode line and the second common electrode line are configured to provide different signals.

According to an embodiment of the present disclosure, there exists a first voltage difference between the pixel electrode and the first common electrode, there exists a second voltage difference between the pixel electrode and the second common electrode, and an absolute value of the first voltage difference is greater than an absolute value of the second voltage difference.

To solve the above problem, another aspect of the present disclosure provides a display device, which includes an opposed substrate, a liquid crystal layer, and an array substrate as mentioned above, wherein the opposed substrate and the array substrate are disposed apart from and opposite to each other, and the liquid crystal layer is disposed between the opposed substrate and the array substrate.

The array substrate and the display device of the present disclosure are provided in a form of that the first common electrode is disposed apart from the pixel electrode, the orthographic projection of the first common electrode on the substrate at least partially overlaps the orthographic projection of the pixel electrode on the substrate, the at least one second common electrode disposed within the layer in which the first common electrode is disposed, the orthographic projection of the second common electrode on the substrate at least partially overlaps the orthographic projection of the pixel electrode on the substrate, and the first common electrode and the second common electrode are insulated from each other. Therefore, in a case that transmittance can be maintained, color gamut of medium and low grayscales is improved. In addition, in a case that the transmittance is increased, the color gamut of grayscale of 255 is slightly reduced, and the color gamut of the medium and low grayscales is improved.

BRIEF DESCRIPTION OF THE SEVERAL VIEWS OF THE DRAWINGS

To illustrate the technical solutions in the embodiments of the present disclosure more clearly, the accompanying drawings used in the description of the embodiments are briefly introduced as follows. Obviously, the accompanying drawings in the following description are only some embodiments of the present disclosure. For those skilled in the art, other drawings can also be obtained from these drawings without creative effort.

DESCRIPTION OF SPECIFIC EMBODIMENTS OF THE INVENTION

Figure 1:
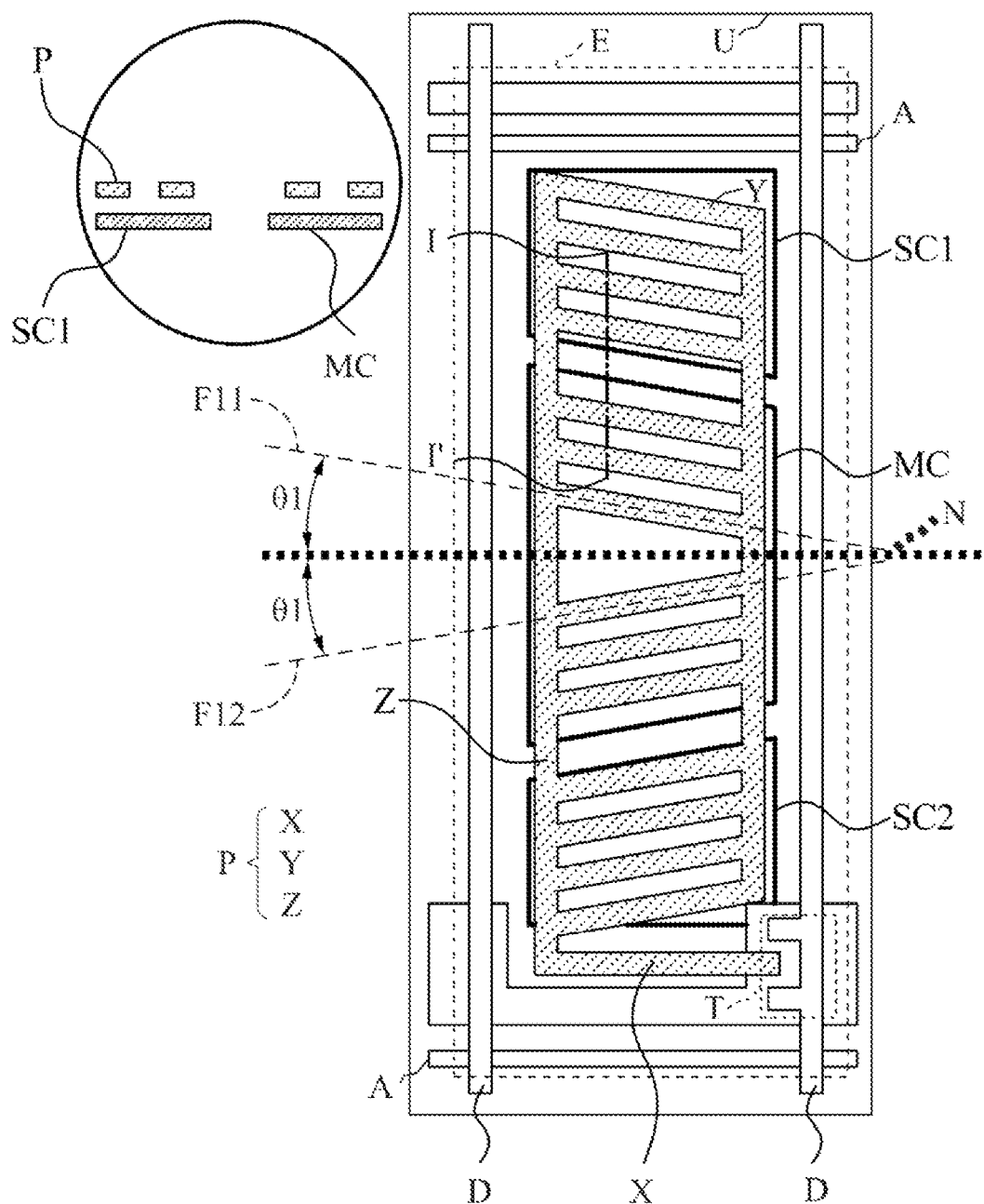
FIG. 1 is a schematic diagram illustrating a top view of an array substrate according to a first embodiment of the present disclosure.

The technical solutions in the embodiments of the present disclosure will be clearly and completely described below with reference to the accompanying drawings in the embodiments of the present disclosure. Obviously, the described embodiments are only some, but not all, embodiments of the present disclosure. Based on the embodiments of the present disclosure, all other embodiments obtained by those skilled in the art without creative efforts shall fall within the protection scope of the present disclosure.

In the description herein, it should be understood that the terms, such as "center," "longitudinal," "lateral," "length," "width," "thickness," "upper," "lower," "front," "rear," "left," "right," "vertical," "horizontal," "top," "bottom," "inside," "outside," "clockwise," and "counterclockwise," instruct the relationship of orientation or position based on the orientation or positional relationship shown in the accompanying drawings, it is only for the convenience of describing the present disclosure and simplifying the description, rather than indicating or implying that the referred device or element has a specific orientation or is constructed and operated in a specific orientation. Therefore, it should not be construed as a limitation of the present disclosure.

In the description herein, it should be understood that the terms such as "first" and "second" are only used for descriptive purposes and cannot be interpreted as indicating or implying relative importance or implicitly indicating the number of indicated technical features. Thus, features defined as "first" and "second" may expressly or implicitly include one or more of said features. In the description of the present disclosure, "plurality" means two or more, unless otherwise expressly and specifically defined.

Numerous different embodiments or examples are provided herein for implementing different structures of the present disclosure. In order to simplify the content of the present disclosure, components and arrangements of specific examples are described below. Certainly, they are only examples and are not intended to limit the present disclosure. Furthermore, the present disclosure may repeat reference numerals and/or reference letters in different examples, this repetition is used for purposes of simplicity and clarity and itself does not indicate a relationship between the various embodiments and/or arrangements discussed. Moreover, various examples of specific processes and materials are provided herein, but those ordinarily skilled in the art may recognize applications of other processes and/or the use of other materials.

In a liquid crystal display device, it is very important to improve color gamut while ensuring fineness of a picture. Examples are described below, but are not limited to the description here.

An aspect of the present invention provides an array substrate, such as an FFS (fringe-field switching) type array substrate, which can be applied to a liquid crystal display device with multiple display domains, but is not limited to the description here.

The following examples illustrate embodiments of the array substrate, but are not limited to the description here.

Figure 2A:
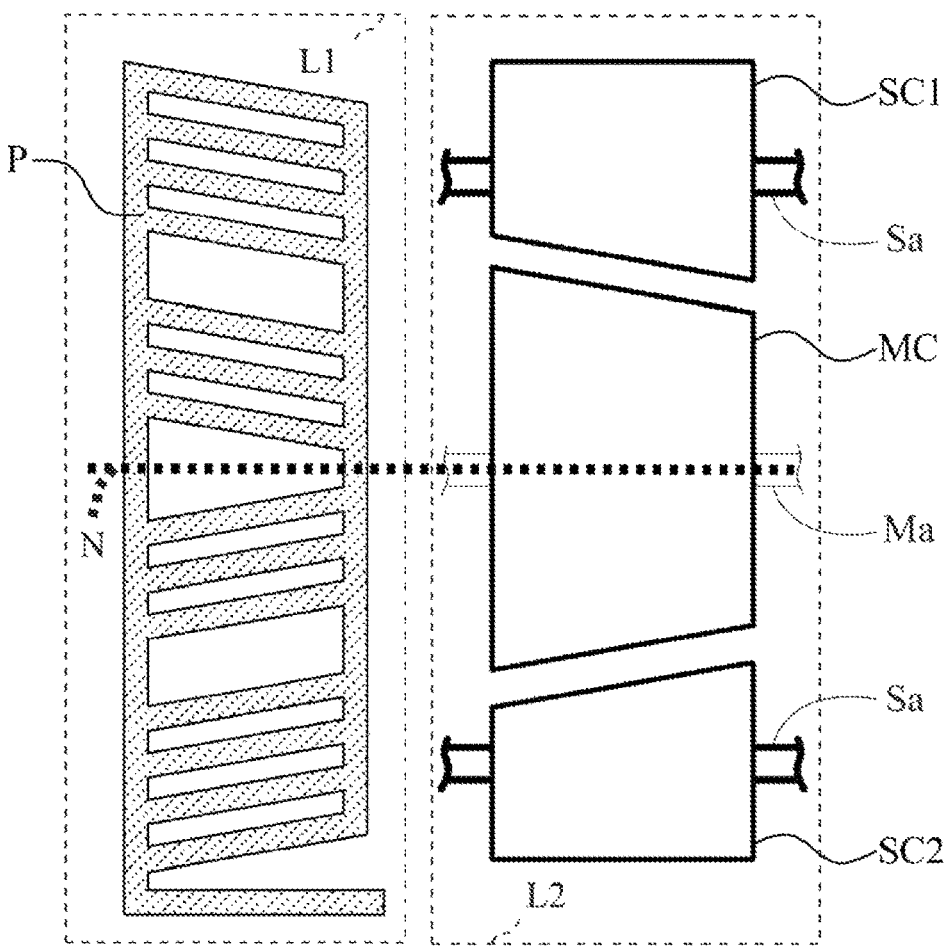
FIG. 2A is a schematic diagram illustrating outlines of a pixel electrode and different common electrodes of the array substrate shown in FIG. 1.

In a first embodiment, as shown in FIGS. 1 and 2A, the array substrate includes a substrate U and a plurality of pixel units E. The plurality of pixel units E are disposed on the substrate U. Each of the pixel units E includes a pixel electrode P, a first common electrode MC, and at least one second common electrode(s) (e.g., SC1 and/or SC2). The number of the at least one second common electrode may be one or more. For example, the pixel electrode P is disposed in a first electrode layer L1. The first common electrode MC is disposed apart from the pixel electrode P. An orthographic projection of the first common electrode MC on the substrate U at least partial overlaps an orthographic projection of the pixel electrode P on the substrate U. The second common electrode(s) (such as SC1 and/or SC2) is disposed in a layer in which the first common electrode MC is disposed, e.g., disposed in the second electrode layer L2. For example, the second common electrode(s) (such as SC1 and/or SC2) is disposed outside the first common electrode MC in an extension direction of data lines D. An orthographic projection of the second common electrode (such as SC1 and/or SC2) on the substrate U at least partial overlaps an orthographic projection of the pixel electrode P on the substrate U. The first common electrode MC and the second common electrode(s) (SC1 and/or SC2) are insulated from each other.

For example, as shown in FIGS. 1 and 2A, the substrate U may be a plate suitable for disposing many material layers of the array substrate, such as glass and the like, which can be used for disposing different material layers in a lamination manner, such as disposing conductive layers, insulation layers, and a passivation layer, and the like. For example, an insulation layer can be provided between different conductive layers to insulate different conductive layers (such as electrode layers) from each other. Herein, for simplifying the description, only exemplary structures related to the characteristics of the embodiments of the present disclosure are illustrated. For example, only one of the pixel units E is used as an example for description, but it is not limited to the description here, and the related description can also be applied to a plurality of pixel units.

It should be understood that the different material layers can be reasonably configured into different components according to actual requirements, such as data lines, scan lines, common lines, common electrodes, thin-film transistors, and pixel electrodes. The following description mainly takes two second common electrodes as an example, but the description is not limited here. The relevant descriptions are also applicable to one or more second common electrodes.

For example, as shown in FIG. 1, the array substrate may further include a plurality of data lines D and a plurality of scan lines (also called gate lines) A. The plurality of data lines D and the plurality of scan lines A are intersected to form a plurality of pixel units E, each of the pixel units E has a pixel electrode P, a first common electrode MC, two second common electrodes SC1 and SC2, and a thin-film transistor T. The thin-film transistor T can be used to control an electric field for the pixel unit E, so as to adjust the shape of liquid crystal materials in space and complete functions of the array substrate.

In the first embodiment, as shown in FIGS. 1 and 2A, the array substrate is configured in a form of a lateral-slit FFS mode. The first electrode layer L1 and the second electrode layer L2 are different conductivity layer. The first electrode layer L1 is configured to have the pixel electrode P. The second electrode layer L2 is configured to have the first common electrode MC and the two second common electrodes SC1 and SC2. The first common electrode MC and the two second common electrodes SC1 and SC2 are located between the pixel electrode P and the substrate U. As shown in FIGS. 1 and 2A, a circular area in FIG. 1 is an enlarged cross-sectional view taken along a line I-I' in FIG. 1 and shows that the first common electrode MC and the second common electrode SC1 are located under the pixel electrode P. Taking the two second common electrodes as an example, because the two second common electrodes SC1 and SC2 are provided in the same layer, the first common electrode MC and the two second common electrodes SC1 and SC2 are located on a lower side of the pixel electrode P, but are not limited to the description here.

For example, in the first embodiment, as shown in FIGS. 1 and 2A, the first common electrode MC can be configured as a main-common electrode (MAIN COM), the two second common electrodes SC1 and SC2 can be regarded as two sub-common electrodes (SUB COM). The first common electrode MC is formed into a mirror-symmetrical structure along a virtual plane N perpendicular to the substrate U. For example, the first common electrode MC is formed into a mirror-symmetrical trapezoidal structure along the virtual plane N, but is not limited to the description here. The two second common electrodes SC1 and SC2 can be symmetrically arranged on two sides of the first common electrode MC. For example, the two second common electrodes SC1 and SC2 can be arranged on two sides of the first common electrode MC in an extension direction of the data lines D. The two second common electrodes SC1 and SC2 are formed into structures being mutually mirror-symmetrical along the virtual plane N. For example, the two second common electrodes SC1 and SC2 can be formed into trapezoidal structures being mutually mirror-symmetrical along the virtual plane N, but is not limited to the description here, e.g., the second common electrodes SC1 and SC2 can also be configured to form into a structure shaped in other shapes. Therefore, adopting a structure of one main-common electrode and two sub-common electrodes can reduce the coupling effect of different common voltages on adjacent pixel electrodes in the extension direction of the scan lines, so that signal crosstalk can be reduced.

Correspondingly, in the first embodiment, as shown in FIGS. 1 and 2A, the pixel electrode P forms a mirror-symmetrical structure along the virtual plane N. For example, the pixel electrode P has a plurality of first branch electrodes Y arranged in intervals, a slit is formed between adjacent two of the first branch electrodes Y. An angle θ1 between the virtual plane N and an extension direction F11 of a part of the first branch electrodes Y located on one side of the virtual plane N is identical to another angle θ1 between the virtual plane N and an extension direction F12 of a part of the first branch electrodes Y located on the other side of the virtual plane N. For example, the extension direction of the first branch electrode Y (such as F11 or F12) refers to a direction extending along an edge on one side of the first branch electrode Y or a direction extending along a virtual central line between edges on two opposite side of the first branch electrode Y, and the angle refers to an angle between the virtual plane N and a direction of the first branch electrodes Y extending from the virtual plane N to a position at the same distance on one of two sides from the virtual plane N. In addition, the characteristics of the plurality of first branch electrodes (e.g., an electrode width or a slit width can be fine-tuned according to the requirements). In an example, the plurality of first branch electrodes Y are arranged in a mirror symmetry manner on two opposite sides of the virtual plane N.

For example, the shape of the slits (such as width and extension direction) between the adjacent branch electrodes Y can correspond to a layout of the first common electrode MC and the two second common electrodes SC1 and SC2. For example, there is an electrode gap between the first common electrode MC and a single second common electrode (such as SC1 or SC2). An extension direction of the electrode gap and an extension direction of the slits between the adjacent branch electrodes Y can be the same. A width of one slit closest to the electrode gap is greater than a width of other slits, and the width of one slit closest to the electrode gap is greater than a width of the electrode gap, but are not limited to the description here.

For example, the pixel electrode P may further include two first trunk electrodes Z, wherein one of the two first trunk electrodes Z is connected to one end of each of the plurality of first branch electrodes Y, and the other of the two first trunk electrodes Z is connected to the other end of each of the plurality of first branch electrodes Y. For example, the two first trunk electrodes Z are arranged in parallel to each other. In addition, the pixel electrode P may further include an extension electrode X. The extension electrode X is connected between one of the two first trunk electrodes Z and a control element (such as a thin-film transistor T), so that the control element can transmit a signal to control the electric field of the pixel electrode P, so as to regulate display effects of different display domains.

In an application example, as shown in FIG. 2A, the array substrate may further include a first common electrode line Ma and a second common electrode line Sa that can be used to transmit different signals. The first common electrode line Ma is connected to the first common electrode MC. The second common electrode line Sa is connected to the second common electrodes SC1 and SC2. The first common electrode line Ma and the second common electrode line Sa are configured to provide different signals.

Figure 2B:
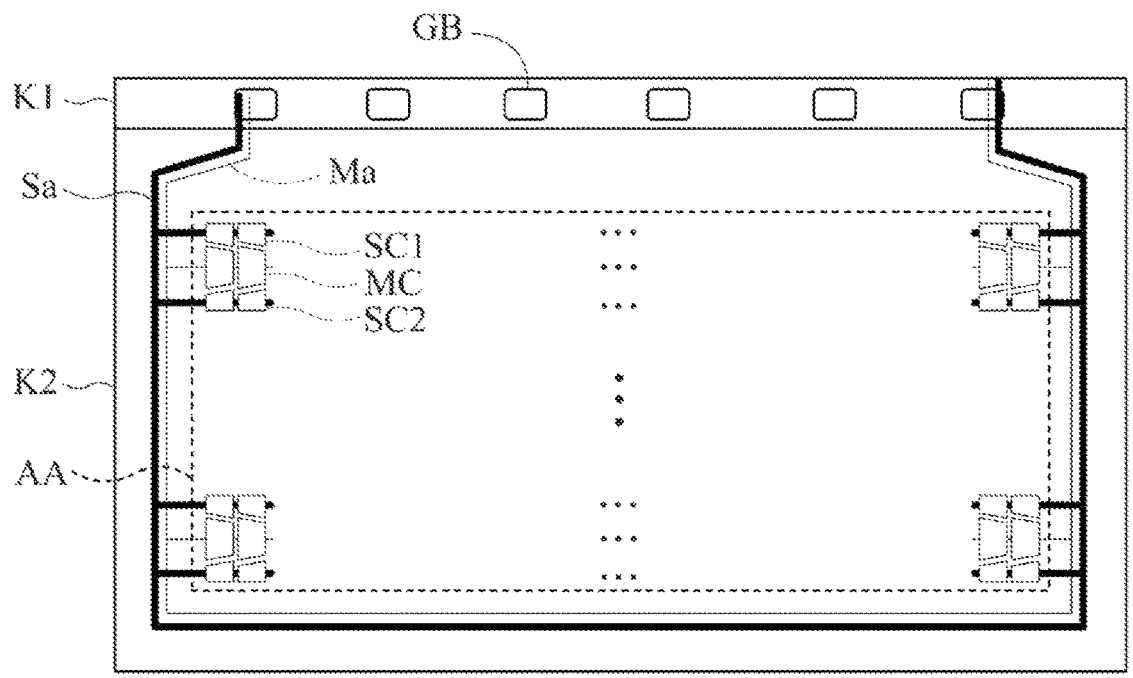
FIG. 2B is a schematic connection diagram illustrating different common electrodes of the array substrate shown in FIG. 1 applied to the chip-on-film technology.

For example, as shown in FIGS. 2A and 2B, taking the chip-on-film (COF) technology as an example, in an active area AA within an overlapping region between an array substrate K1 and a color filter substrate K2, the plurality of first common electrodes MC are connected to the first common electrode line Ma, and the second common electrodes SC1 and SC2 are connected to the second common electrode line Sa. For example, the first common electrode line Ma and the second common electrode line Sa can be configured to provide different signals, e.g., different signals from a number of gold bumps GB within a non-overlapping region between the array substrate K1 and the color filter substrate K2.

Figure 3:
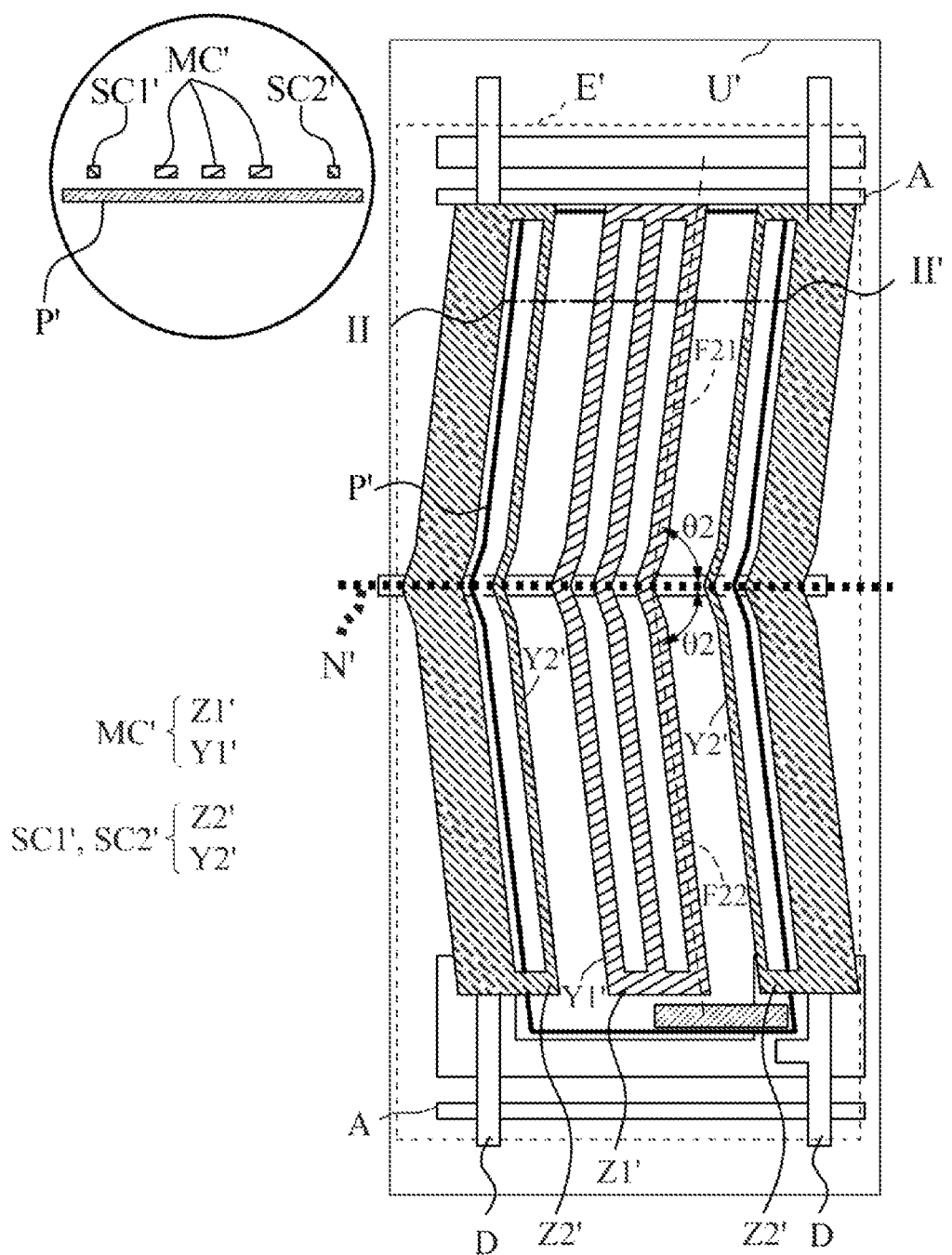
FIG. 3 is a schematic diagram illustrating a top view of an array substrate according to a second embodiment of the present disclosure.
Figure 4A:
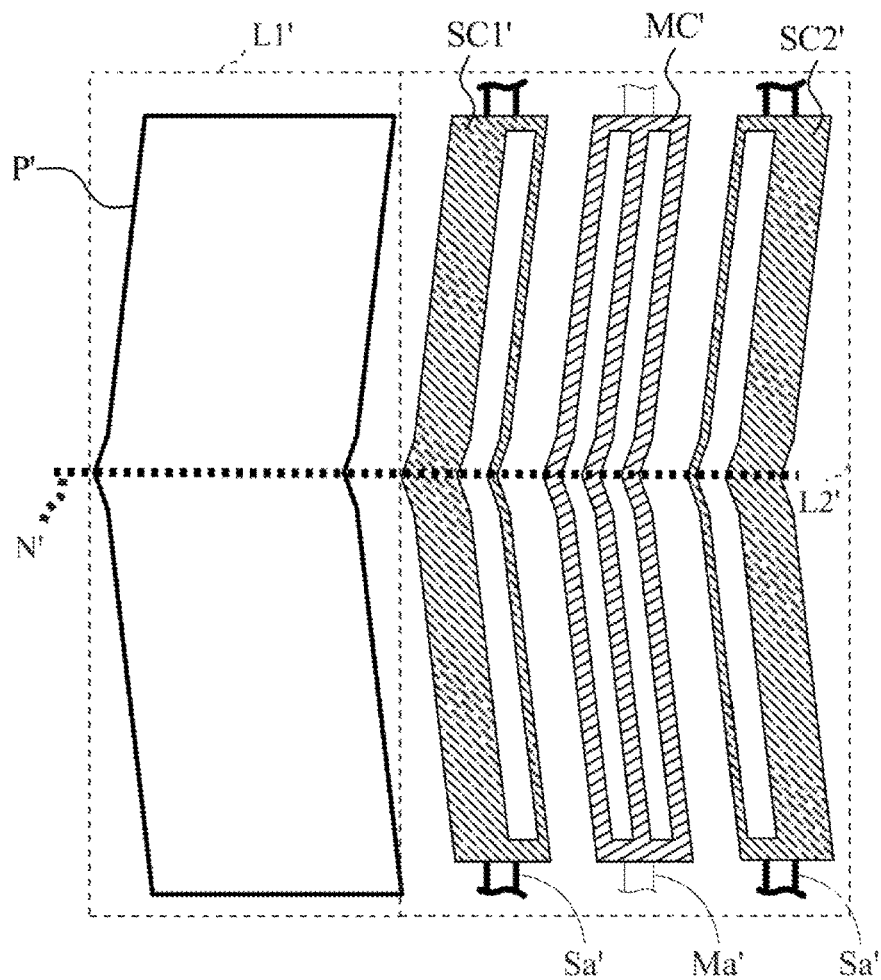
FIG. 4A is a schematic diagram illustrating outlines of a pixel electrode and different common electrodes of the array substrate shown in FIG. 3.

In addition, in the second embodiment, as shown in FIGS. 3 and 4A, the array substrate includes a substrate U' and a plurality of pixel units E'. The plurality of pixel units E' are disposed on the substrate U'. Each of the pixel units E' includes a pixel electrode P', a first common electrode MC', and at least a second common electrode(s) (e.g., SC1' and/or SC2'). The pixel electrode P' is, for example, disposed in the first electrode layer L1'. One first common electrode MC' is disposed apart from the pixel electrode P'. An orthographic projection of the first common electrode MC' on the substrate U' at least partially overlaps an orthographic projection of the pixel electrode P' on the substrate U'. One second common electrode SC1' or SC2' is disposed in a layer in which the first common electrode MC' is disposed, e.g., disposed in the second electrode layer L2'. The second common electrode SC1' or SC2' is disposed outside the first common electrode MC' in an extension direction of scan lines A. An orthographic projection of the second common electrode SC1' or SC2' on the substrate U' at least partially overlaps an orthographic projection of the second common electrode SC1' or SC2'.

For example, as shown in FIGS. 3 and 4A, the substrate U' may be a plate suitable for disposing many material layers of the array substrate, such as glass and the like, which can be used for disposing different material layers in a lamination manner, such as disposing conductive layers, insulation layers, and a passivation layer, and the like. For example, an insulation layer can be provided between different conductive layers to insulate different conductive layers (such as electrode layers) from each other. Herein, for simplifying the description, only exemplary structures related to the characteristics of the embodiments of the present disclosure are illustrated. For example, only one of the pixel units E' is used as an example for description, but it is not limited to the description here, and the related description can also be applied to a plurality of pixel units.

For example, as shown in FIG. 3, the array substrate may further include a plurality of data lines D and a plurality of scan lines (also called gate lines) A. The plurality of data lines D and the plurality of scan lines A are intersected to form a plurality of pixel units E', each of the pixel units E' has a pixel electrode P', a first common electrode MC', two second common electrodes SC1' and SC2', and a thin-film transistor. The thin-film transistor can be used to control an electric field for the pixel unit, so as to adjust the shape of liquid crystal materials in space and complete functions of the array substrate.

In the second embodiment, as shown in FIGS. 3 and 4A, the array substrate is configured in a form of a vertical-slit FFS mode. The first electrode layer L1' and the second electrode layer L2' are of different conductivity layer. The first electrode layer L1' is configured to have the pixel electrode P'. The second electrode layer L2' is configured to have the first common electrode MC' and the second common electrode(s) SC1' and/or SC2'. The pixel electrode P' is disposed between the substrate U' and the first and second common electrodes MC' and SC1' and/or SC2'. For example, each of the first common electrode MC' and the second common electrode(s) SC1' and/or SC2' forms into a mirror-symmetrical structure along a virtual plane N' perpendicular to the substrate. As shown in FIGS. 3 and 4A, a circular area in FIG. 3 is an enlarged cross-sectional view taken along a line II-II' in FIG. 3 and shows that the first common electrode MC' and the second common electrodes SC1' and SC2' are located above the pixel electrode P'. Taking the two second common electrodes as an example, because the two second common electrodes SC1' and SC2' are provided in the same layer, the first common electrode MC' and the two second common electrodes SC1' and SC2' are located on an upper side of the pixel electrode P', but are not limited to the description here.

For example, in the second embodiment, as shown in FIGS. 3 and 4A, the first common electrode MC' can be configured as a main-common electrode (MAIN COM), the two second common electrodes SC1' and SC2' can be regarded as two sub-common electrodes (SUB COM). For example, the two second common electrodes SC1' and SC2' are arranged on two sides of the first common electrode MC' in an extension direction of the scan line A. The first common electrode MC' and the two second common electrodes SC1' and SC2' are formed into mirror-symmetrical structures along a virtual plane N' (e.g., located at a common line) perpendicular to the substrate U'. For example, each of the first common electrode MC' and the two second common electrodes SC1' and SC2' has a plurality of second branch electrodes arranged in intervals. For example, the first common electrode MC' has a plurality of second branch electrodes Y1' arranged at intervals, each of the two second common electrodes SC1' and SC2' has a plurality of second branch electrodes Y2' arranged at intervals, and a slit is formed between adjacent two of the second branch electrodes (e.g., Y1' and Y2').

Taking the first common electrode MC' as an example, an angle θ2 between the virtual plane N' and an extension direction F21 of a part of the second branch electrodes Y1' located on one side of the virtual plane N' is identical to another angle θ2 between the virtual plane N' and an extension direction F22 of a part of the second branch electrodes Y1' located on the other side of the virtual plane N'. For example, the extension direction of the second branch electrode Y1' (such as F21 or F22) refers to a direction extending along an edge on one side of the second branch electrode Y1' or a direction extending along a virtual central line between edges on two opposite side of the second branch electrode Y1'. In FIG. 3, for the convenience of description, only a main extending direction of the second branch electrode Y1' is shown by a straight dashed line. The angle refers to an angle between the virtual plane N' and a direction of the second branch electrodes Y1' extending from the virtual plane N' to a position at the same distance on one of two sides from the virtual plane N'. The related descriptions also apply to the two second common electrodes SC1' and SC2'.

In an example, the plurality of second branch electrodes (such as Y1' and Y2') are arranged in a mirror symmetry manner on two opposite sides of the virtual plane N'. The characteristics (such as a width or an extension direction, etc.) of the first common electrode MC' and the second branch electrodes (such as Y1' and Y2') of the two second common electrodes SC1' and SC2' can be fine-tuned to form a specific layout according to requirements. For example, a plurality of slits formed in the first common electrode MC' are evenly distributed, and a single slit formed in each of the second common electrodes SC1' and SC2' is close to the first common electrode MC', but are not limited to the description here.

For example, the first common electrode MC' further includes two second trunk electrodes Z1', and the two second common electrodes SC1' and SC2' further include two second trunk electrodes Z2', wherein one of the two second trunk electrodes Z1' of the first common electrode MC' is connected to one end of each of the plurality of second branch electrodes Y1' of the first common electrode MC', the other of the two second trunk electrodes Z1' of the first common electrode MC' is connected to the other end of each of the second branch electrodes Y1' of the first common electrode MC', one of the two second trunk electrodes Z2' of the second common electrode(s) (SC1' and/or SC2') is connected to one end of each of the plurality of second branch electrodes Y2' of the second common electrode(s) (SC1' and/or SC2'), and the other of the two second trunk electrodes Z2' of the second common electrode(s) (SC1' and/or SC2') is connected to the other end of each of the second branch electrodes Y2' of the second common electrode(s) (SC1' and/or SC2'), so as to form different display domains.

Therefore, the structure of the two sub-common electrodes can reduce the coupling effect of the signals on the two sides of the data lines due to different common voltages, so that signal crosstalk can be reduced.

Correspondingly, in the second embodiment, as shown in FIGS. 3 and 4A, the pixel electrode P' is formed into a mirror-symmetric structure along the virtual plane N' to correspond mirror-symmetric structures of the two second common electrodes (SC1' and SC2').

In an application example, as shown in FIG. 4A, the array substrate may further include a first common electrode line Ma' and a second common electrode line Sa' that can be used to transmit different signals. The first common electrode line Ma' is connected to the first common electrode MC'. The second common electrode line Sa' is connected to the second common electrodes SC1' and SC2'. The first common electrode line Ma' and the second common electrode line Sa' are configured to provide different signals.

Figure 4B:
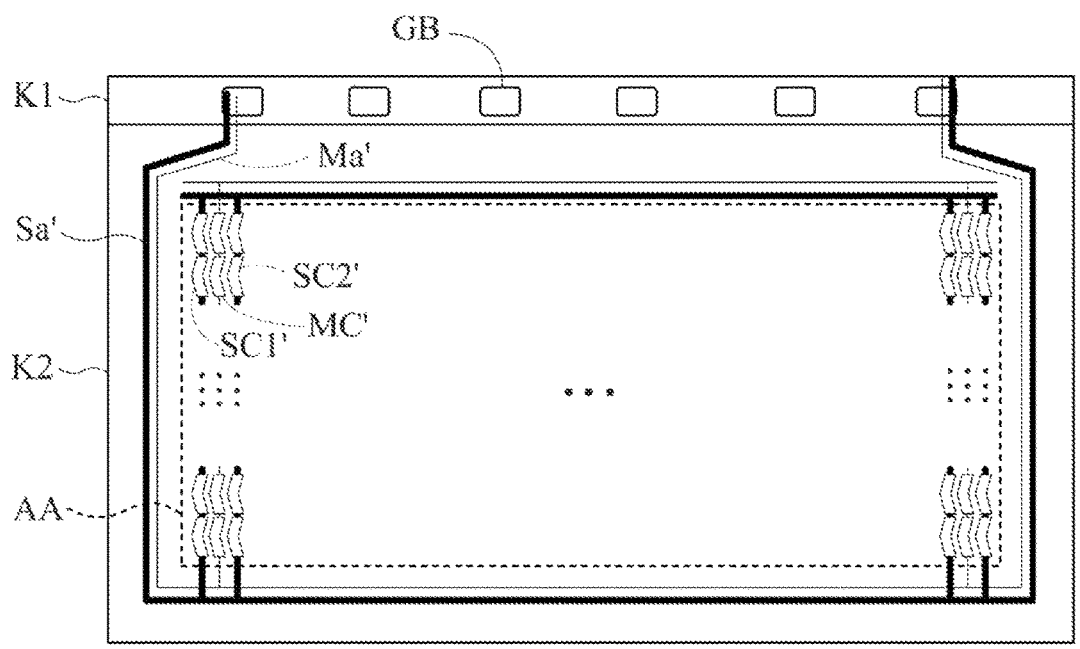
FIG. 4B is a schematic connection diagram illustrating different common electrodes of the array substrate in FIG. 3 applied to the chip-on-film technology.

For example, as shown in FIGS. 4A and 4B, taking the chip-on-film technology as an example, in an active area AA within an overlapping region between an array substrate K1 and a color filter substrate K2, the plurality of first common electrodes MC' are connected to the first common electrode line Ma', and the second common electrodes SC1' and SC2' are connected to the second common electrode line Sa'. For example, the first common electrode line Ma' and the second common electrode line Sa' can be configured to provide different signals, e.g., different signals from a number of gold bumps GB within a non-overlapping region between the array substrate K1 and the color filter substrate K2.

It should be noted that, during use of the array substrate, the first common electrode and the two second common electrodes can be used to fine-tune color gamut by providing different power supply configurations. To simplify the description, only the first common electrode MC and the two second common electrodes SC1 and SC2 (as shown in FIGS. 1 and 2A) of the first embodiment are used as an example for illustration, and the related descriptions are also applicable to the first common electrode MC' and the two second common electrodes SC1' and SC2' of the second embodiment (as shown in FIGS. 3 and 4A).

Figure 5:
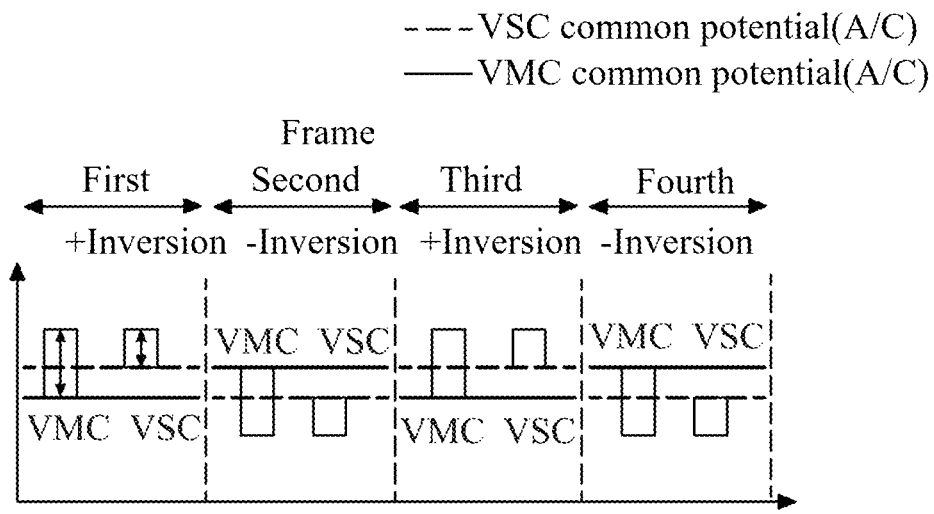
FIG. 5 is a schematic diagram of input signals for two common electrodes according to an embodiment of the present disclosure.

For example, in a power supply configuration, e.g., electrodes of the array substrate are connected to a suitable power supply, in one example, as shown in FIG. 5, taking four frames as an example, the first, second, third, and fourth frames are respectively "+", "−", "+", and "−" inversion potentials, and VMC and VSC respectively represent voltages of the first and second common electrodes (i.e., the main-common electrode and the sub-common electrode). It can be seen from the figure, there is a voltage difference between the voltage VMC of the first common electrode and the voltage VSC of the second common electrode. For example, during potential inversion in different frames, polarities of both the voltage VMC of the first common electrode and the voltage VSC of the second common electrode will change. Namely, the voltage VMC of the first common electrode and the voltage VSC of the second common electrode is configured in a form of alternating current (A/C), and an absolute value of a voltage amplitude of the voltage VMC of the first common electrode is greater than an absolute value of a voltage amplitude of the voltage VSC of the second common electrode, so that there exists a first voltage difference between the pixel electrode and the first common electrode, and there exists a second voltage difference between the pixel electrode and the second common electrode, wherein an absolute value of the first pressure difference is greater than an absolute value of the second pressure difference. Voltage differences always exist regardless of the display state of medium and low grayscales or high grayscales. The color gamut can be fine-tuned by providing different power supply configurations, not limited to the description here.

Figure 6:
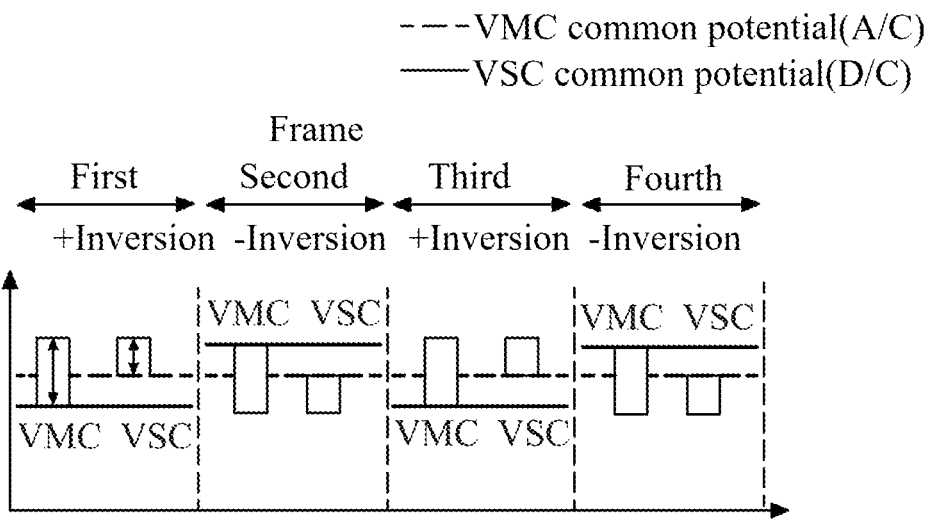
FIG. 6 is another schematic diagram of input signals for two common electrodes according to an embodiment of the present disclosure.

For example, in another example, as shown in FIG. 6, taking four frames as an example, the first, second, third, and fourth frames are respectively "+", "−", "+", and "−" inversion potentials, VMC and VSC respectively represent voltages of the first and second common electrodes. It can be seen from the figure, there is a voltage difference between the voltage VMC of the first common electrode and the voltage VSC of the second common electrode. For example, during potential inversion in different frames, polarity of the voltage VMC of the first common electrode will change, and polarity of the voltage VSC of the second common electrode will not change. Namely, the voltage VMC of the first common electrode is configured in a form of alternating current (A/C), the voltage VSC of the second common electrode is configured in a form of direct current (D/C). an absolute value of a voltage amplitude of the voltage VMC of the first common electrode is greater than an absolute value of a voltage amplitude of the second common electrode VSC, so that there exists a first voltage difference between the pixel electrode and the first common electrode, there exists a second voltage difference between the pixel electrode and the second common electrode, wherein an absolute value of the first differential pressure is greater than an absolute value of the second differential pressure. Voltage differences always exist regardless of the display state of medium and low grayscales or high grayscales. The color gamut can be fine-tuned by providing different power supply configurations.

Figure 7:
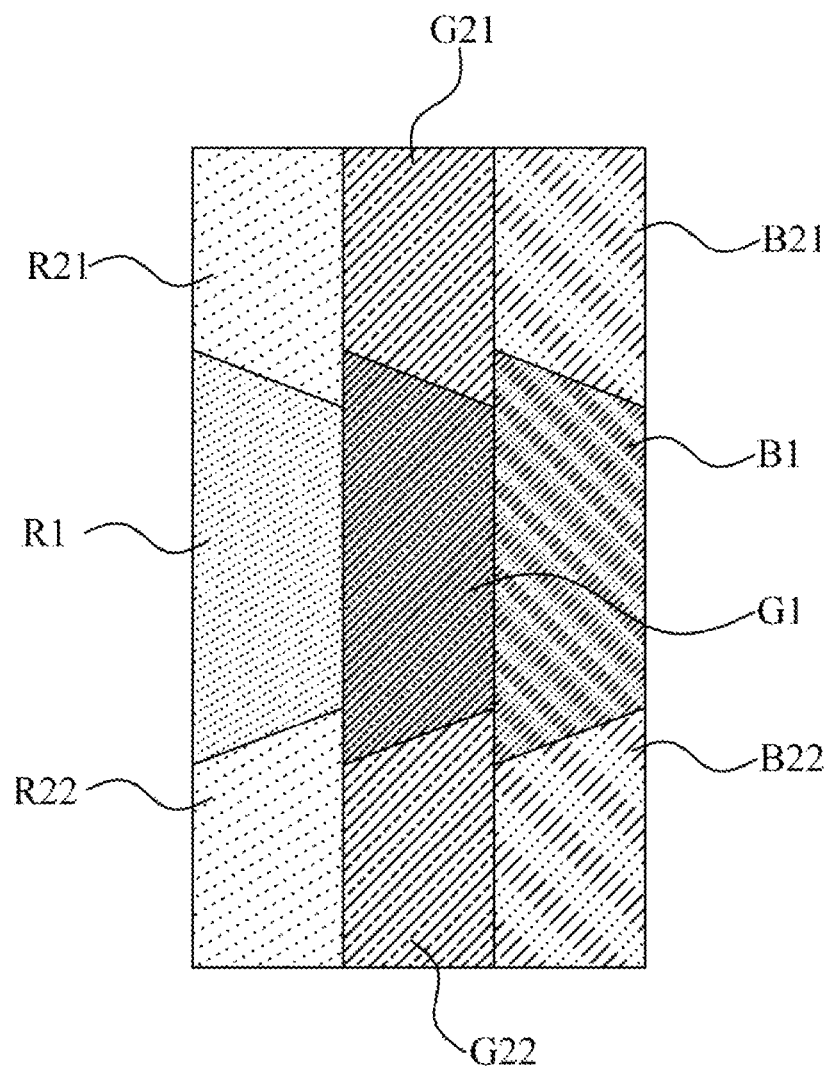
FIG. 7 is a schematic diagram of a color gamut form of the array substrate according to the first embodiment of the present disclosure.

For example, taking the red (R), green (G), and blue (B) sub-pixels as an example, as shown in FIGS. 2A and 7, from left to right, the red, green, and blue sub-pixels are shown in color gamut forms of the array substrate of the first embodiment. For example, a left part shows the red sub-pixel in which color gamut within a display area R1 corresponding to the first common electrode MC is higher than color gamut within each of display areas R21 and R22 corresponding to the two second common electrodes SC1 and SC2. For example, a middle part shows the green sub-pixel in which color gamut within a display area G1 corresponding to the first common electrode MC is higher than color gamut within each of display areas G21 and G22 corresponding to the two second common electrodes SC1 and SC2. For example, a right part shows the blue sub-pixel in which color gamut within a display area B1 corresponding to the first common electrode MC is higher than color gamut within each of display areas B21 and B22 corresponding to the two second common electrodes SC1 and SC2.

Figure 8:
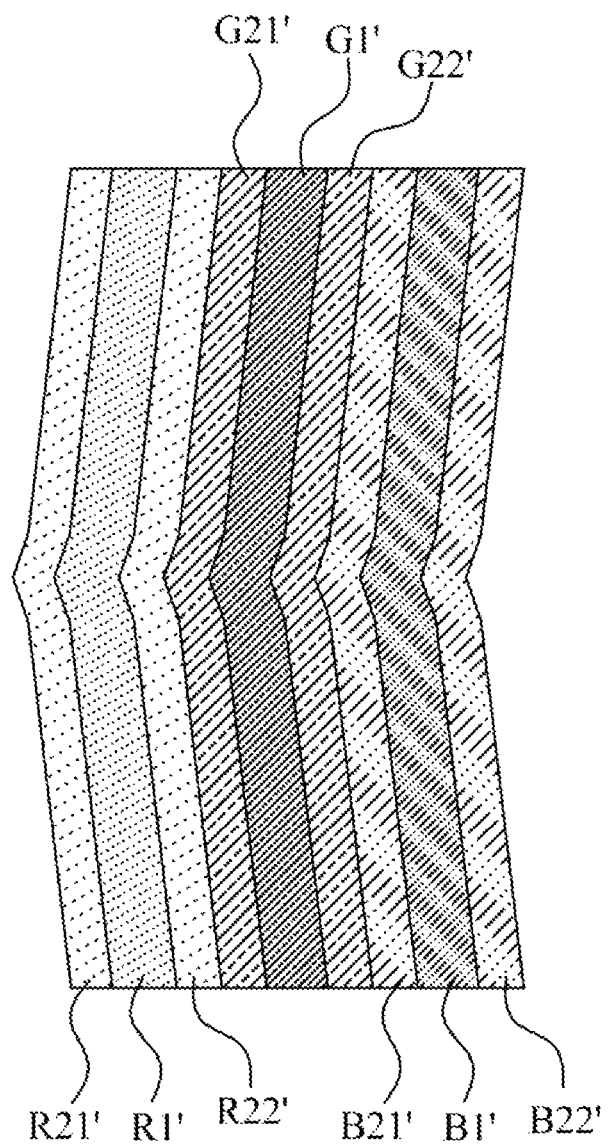
FIG. 8 is a schematic diagram of a color gamut form of the array substrate according to the second embodiment of the present disclosure.

Similarly, taking red (R), green (G), and blue (B) sub-pixels as an example, as shown in FIGS. 4A and 8, from left to right, the red, green, and blue sub-pixels are shown in color gamut forms of the array substrate of the second embodiment. For example, a left part shows the red sub-pixel in which color gamut within a display area R1' corresponding to the first common electrode MC' is higher than color gamut within each of display areas R21' and R22' corresponding to the two second common electrodes SC1' and SC2'. For example, a middle part shows the green sub-pixel in which color gamut within a display area G1' corresponding to the first common electrode MC' is higher than color gamut within each of display areas G21' and G22' corresponding to the two second common electrodes SC1' and SC2'. For example, a right part shows the blue sub-pixel in which color gamut within a display area B1' corresponding to the first common electrode MC' is higher than color gamut within each of display areas B21' and B22' corresponding to the two second common electrodes SC1' and SC2'. The description is not limited here, the above description can also be adapted to other sub-pixel configurations, such as an RGBW configuration, to fine-tune the color gamut by providing power supply configurations for different common electrodes.

It should be understood that the array substrate of the embodiments of the present disclosure has a variety of common electrodes, and only two kinds of common electrodes are used as examples for description, so as to fine-tune the color gamut by providing two power supply configurations, but are not limited to the description here. For example, according to an example as the above two kinds of common electrodes, the variety of common electrodes may be n kinds of common electrodes, wherein n may be selected as a positive integer greater than or equal to 2, such as n=2, 3, 4, and others. Taking n=3 as an example, the second electrode layer can be configured to have a first common electrode, two second common electrodes, and two third common electrodes, wherein the first common electrode is located between the two second common electrodes, the two third common electrodes are located on both sides of the first common electrode, and the two second common electrodes are located between the first common electrode and the two third common electrodes. According to the above description, other configurations of the variety of common electrodes are understandable. For example, the first common electrode is located between the two second common electrodes, and the other groups of common electrodes (such as two third common electrodes, two fourth common electrodes, and the like) are located on both sides of the first common electrode and are sequentially arranged in parallel outside the two second common electrodes, which will not be repeated.

The following examples are illustrated for color gamut performance of the array substrate with various common electrodes according to the embodiment of the present disclosure, but are not limited to the description here.

Figure 9:
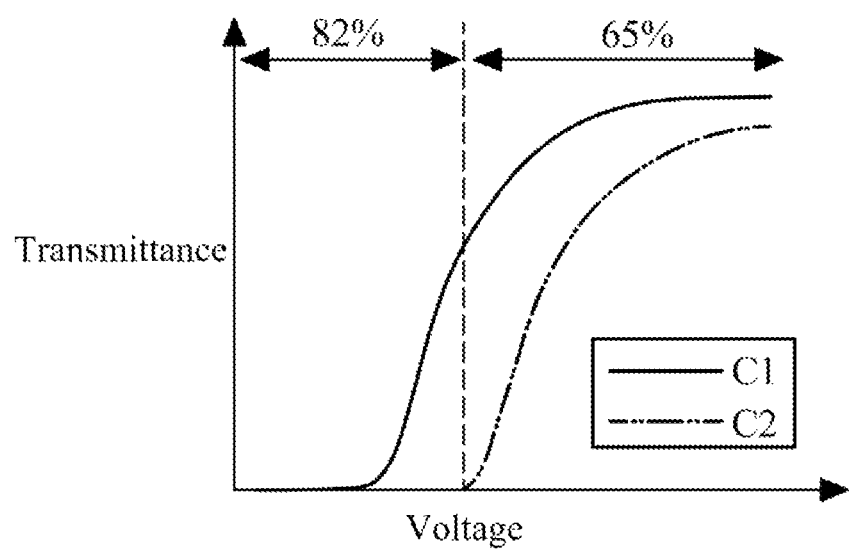
FIG. 9 is a schematic diagram of color gamut curves of two common electrodes according to an embodiment of the present disclosure.

For example, FIG. 9 shows a schematic diagram of color gamut curves of an array substrate with various common electrodes according to an embodiment of the present disclosure. For example, a curve C1 shows a relationship between transmittance (Transmittance, Tr) and voltage of the first common electrode, and a curve C2 shows a relationship between transmittance and voltage of the second common electrode, wherein the curve C1 indicates that the first common electrode covers 82% of the entire color gamut, and the curve C2 indicates that the second common electrode covers 65% of the entire color gamut.

Figure 10:
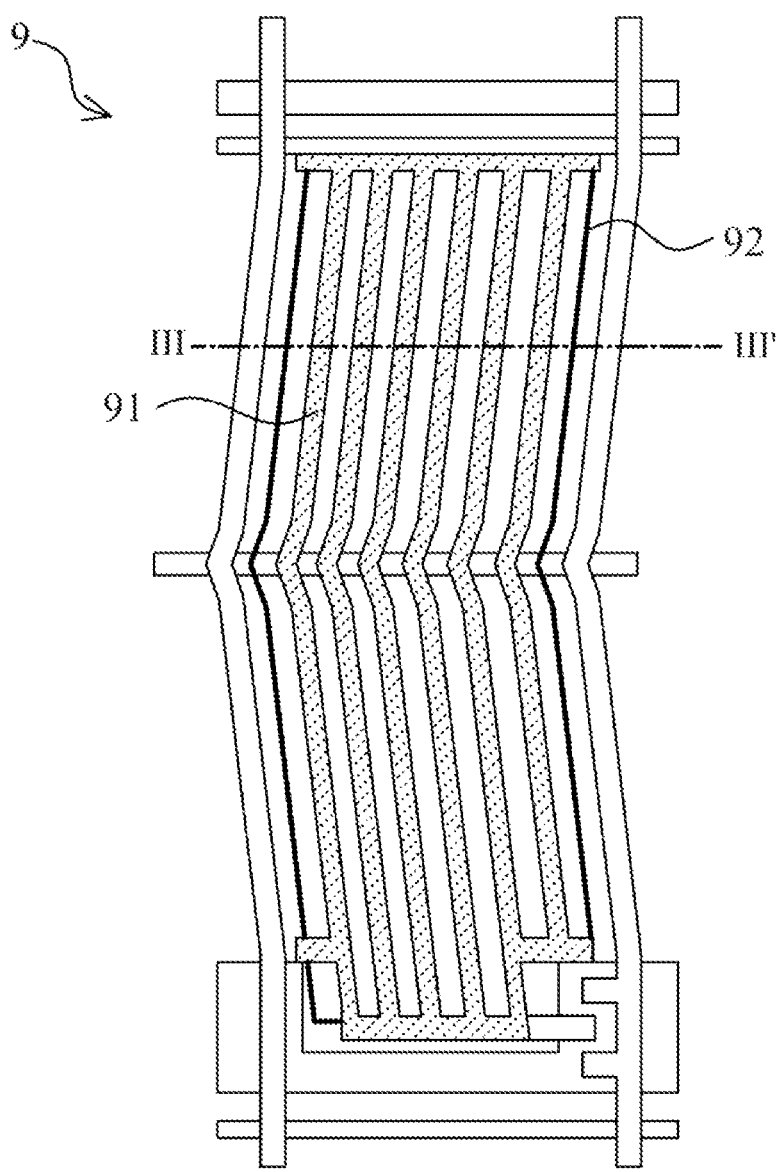
FIG. 10 is a schematic diagram illustrating a top view of an array substrate with a single common electrode.
Figure 11:
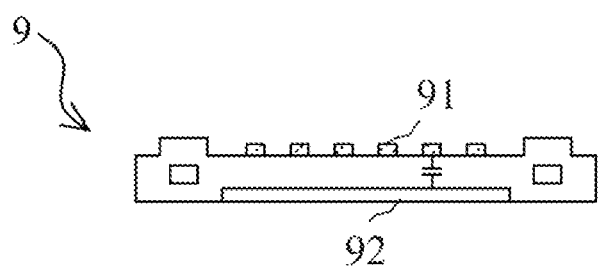
FIG. 11 is a schematic diagram illustrating a cross-sectional view taken along a line III-III' regarding the array substrate shown in FIG. 10.

The color gamut effect of the array substrate provided with various common electrodes according to the above-mentioned embodiments of the present disclosure will be described below. In contrast, as shown in FIG. 10, an array substrate 9 with a single common electrode includes a single pixel electrode 91 and a single common electrode 92, wherein a cross-sectional schematic diagram of a line III-III' is shown in FIG. 11, and the common electrode 92 is disposed under the pixel electrode 91.

Figure 12:
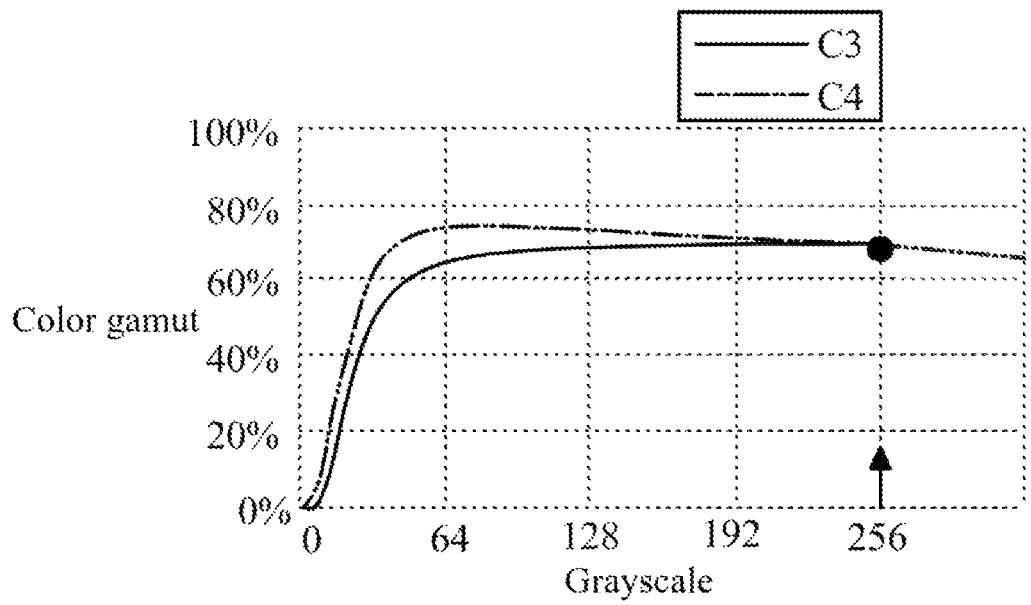
FIG. 12 is a schematic diagram showing a first color gamut comparison between an array substrate with multiple common electrodes and an array substrate with a single common electrode.

For example, in terms of performance of increasing color gamut, as shown in FIG. 12, a curve C3 represents a relationship between color gamut and grayscale of the array substrate with a single common electrode provided above, and a curve C4 represents a relationship between color gamut and grayscale of the array substrate with multiple common electrodes of the above-mentioned embodiments of the present disclosure. As shown by the curves C3 and C4, compared with the array substrate with the single common electrode, the array substrate with multiple common electrodes according to the above embodiments of the present disclosure can improve the color gamut of medium and low grayscales in the case of maintaining the transmittance.

Figure 13:
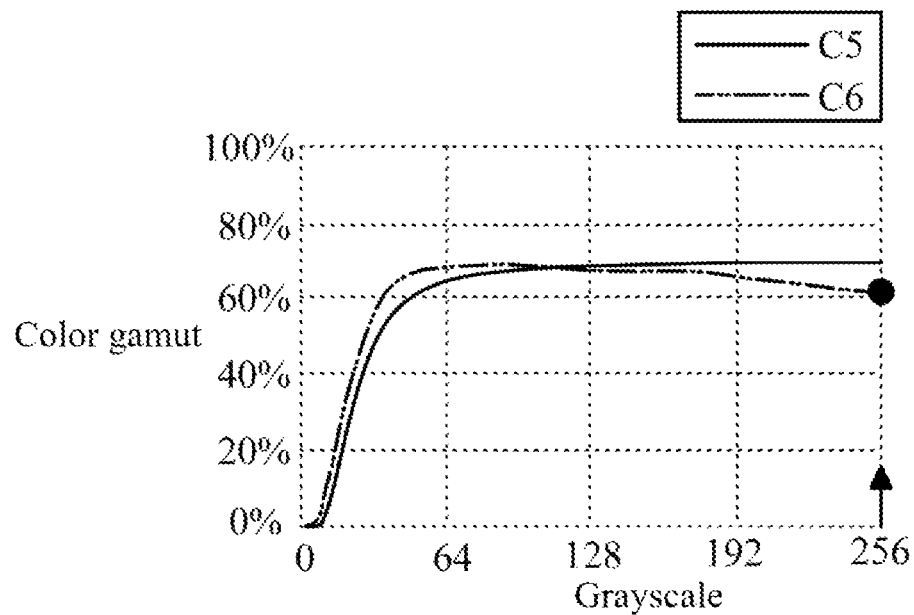
FIG. 13 is a schematic diagram showing a second color gamut comparison between an array substrate with multiple common electrodes and an array substrate with a single common electrode.

Illustratively, in terms of the performance of RGBW display effects, as shown in FIG. 13, a curve C5 represents a relationship between color gamut and grayscale of the array substrate with a single common electrode provided above, and a curve C6 represents a relationship between color gamut and grayscale of the array substrate with multiple common electrodes of the above-mentioned embodiments of the present disclosure. As shown by the curves C5 and C6, compared with the array substrate with the single common electrode, the array substrate with multiple common electrodes according to the above embodiments of the present disclosure can slightly reduce the color gamut of grayscale of 255 and improve the color gamut of medium and low grayscales.

In addition, another aspect of the present disclosure provides a display device, such as a liquid crystal display device. For example, the display device includes an opposed substrate, a liquid crystal layer, and an array substrate as mentioned above, wherein the opposed substrate and the array substrate are disposed apart from and opposite to each other, and the liquid crystal layer is disposed between the opposed substrate and the array substrate. Implementations and beneficial effects of the array substrate are described above and will not be repeated here.

The array substrate and the display device of the above embodiments of the present disclosure are provided in a form of that the first common electrode is disposed apart from the pixel electrode, the orthographic projection of the first common electrode on the substrate at least partially overlaps the orthographic projection of the pixel electrode on the substrate, the at least one second common electrode disposed within the layer in which the first common electrode is disposed, the orthographic projection of the second common electrode on the substrate at least partially overlaps the orthographic projection of the pixel electrode on the substrate, and the first common electrode and the second common electrode are insulated from each other. Therefore, in a case that transmittance can be maintained, color gamut of medium and low grayscales is improved. In addition, in a case that the transmittance is increased, the color gamut of grayscale of 255 is slightly reduced, and the color gamut of the medium and low grayscales is improved.

Embodiments of the present disclosure are described above in detail. Principles and implementations of the present disclosure are described herein using specific examples. Descriptions of the above embodiments are only used to help understand the technical solutions and core ideas of the present disclosure. A skilled person should understand that it is still possible to modify the technical solutions recorded in the previous embodiments or perform equivalent replacements on some technical features. In addition, these modifications or replacements do not make the essence of the corresponding technical solutions deviate from examples of the scope of technical solutions of the present disclosure.

What is claimed is:

1. An array substrate, comprising:
   a substrate;
   a plurality of pixel units disposed on the substrate, wherein the plurality of pixel units are formed in a manner of intersecting a plurality of data lines with a plurality of scan lines, and each of the plurality of pixel units comprises:
   a pixel electrode;
   a first common electrode disposed apart from the pixel electrode, wherein an orthographic projection of the first common electrode on the substrate at least partially overlaps an orthographic projection of the pixel electrode on the substrate; and
   at least one second common electrode disposed in a layer in which the first common electrode is disposed, wherein an orthographic projection of the second common electrode on the substrate at least partially overlaps the orthographic projection of the pixel electrode on the substrate; and a first common electrode line and a second common electrode line, wherein the first common electrode line is connected to the first common electrode, the second common electrode line is connected to the second common electrode, and the first common electrode line and the second common electrode line are configured to provide different signals;

wherein the first common electrode and the second common electrode are insulated from each other;

wherein the number of the at least one second common electrode is two, and the two second common electrodes are arranged on two sides of the first common electrode in an extension direction of the data lines or an extension direction of the scan lines.

2. An array substrate, comprising:

a substrate; and a plurality of pixel units disposed on the substrate, wherein each of the pixel units comprises:

a pixel electrode;

a first common electrode disposed apart from the pixel electrode, wherein an orthographic projection of the first common electrode on the substrate at least partially overlaps an orthographic projection of the pixel electrode on the substrate; and at least one second common electrode disposed in a layer in which the first common electrode is disposed, wherein an orthographic projection of the second common electrode on the substrate at least partially overlaps the orthographic projection of the pixel electrode on the substrate;

wherein the first common electrode and the second common electrode are insulated from each other;

wherein the first common electrode is formed into a mirror-symmetrical structure along a virtual plane perpendicular to the substrate, and the second common electrode is disposed outside the first common electrode;

wherein the plurality of pixel units are formed in a manner of intersecting a plurality of data lines with a plurality of scan lines, the number of the at least one second common electrodes is two, and the two second common electrodes are arranged on two sides of the first common electrode in an extension direction of the data lines.

3. The array substrate as claimed in claim 2, wherein the first and the second common electrodes are disposed between the pixel electrode and the substrate.

4. The array substrate as claimed in claim 2, wherein the pixel electrode is disposed between the substrate and the first and second common electrodes.

5. The array substrate as claimed in claim 2, wherein the two second common electrodes are formed into structures being mutually mirror-symmetrical along the virtual plane.

6. The array substrate as claimed in claim 2, wherein the pixel electrode has a plurality of first branch electrodes arranged at intervals, a slit is formed between adjacent two of the first branch electrodes, and an angle between the virtual plane and an extension direction of a part of the first branch electrodes located on one side of the virtual plane is identical to an angle between the virtual plane and an extension direction of a part of the branch electrodes on the other side of the virtual plane.

7. The array substrate as claimed in claim 6, wherein the pixel electrode further comprises two first trunk electrodes, wherein one of the two first trunk electrodes is connected to one end of each of the plurality of first branch electrodes, and the other of the two first trunk electrodes is connected to the other end of each of the plurality of first branch electrodes.

8. The array substrate as claimed in claim 7, wherein the pixel electrode further comprises an extension electrode connected between one of the two first trunk electrodes and a control element.

9. The array substrate as claimed in claim 6, wherein the plurality of first branch electrodes are arranged in a mirror symmetry manner on two opposite sides of the virtual plane.

10. The array substrate as claimed in claim 2, wherein each of the first and second common electrodes is formed into a mirror-symmetrical structure along a virtual plane perpendicular to the substrate.

11. The array substrate as claimed in claim 10, wherein the plurality of pixel units are formed in a manner of intersecting a plurality of data lines with a plurality of scan lines, the number of the at least one second common electrodes is two, and the two second common electrodes are arranged on two sides of the first common electrode in an extension direction of the scan lines.

12. The array substrate as claimed in claim 11, wherein each of the first common electrode and the two second common electrodes has a plurality of second branch electrodes arranged at intervals, a slit is formed between adjacent two of the second branch electrodes, and an angle between the virtual plane and an extension direction of a part of the second branch electrodes located on one side of the virtual plane is identical to an angle between the virtual plane and an extension direction of a part of the branch electrodes on the other side of the virtual plane.

13. The array substrate as claimed in claim 12, wherein each of the first common electrode and the two second common electrodes further comprises two second trunk electrodes, one of the two second trunk electrodes of the first common electrode is connected to one end of each of the plurality of second branch electrodes of the first common electrode, the other of the two second trunk electrodes of the first common electrode is connected to the other end of each of the second branch electrodes of the first common electrode, one of the two second trunk electrodes of the second common electrode is connected to one end of each of the plurality of second branch electrodes of the second common electrode, and the other of the two second trunk electrodes of the second common electrode is connected to the other end of each of the second branch electrodes of the second common electrode.

14. The array substrate as claimed in claim 10, wherein the pixel electrode is formed into a mirror-symmetric structure along the virtual plane.

15. The array substrate as claimed in claim 2, wherein the array substrate further comprises a first common electrode line and a second common electrode line, the first common electrode line is connected to the first common electrode, the second common electrode line is connected to the second common electrode, and the first common electrode line and the second common electrode line are configured to provide different signals.

16. The array substrate as claimed in claim 15, wherein there exists a first voltage difference between the pixel electrode and the first common electrode, there exists a second voltage difference between the pixel electrode and the second common electrode, and an absolute value of the first voltage difference is greater than an absolute value of the second voltage difference.

17. A display device, comprising an opposed substrate, a liquid crystal layer, and an array substrate, wherein the array substrate comprises:

a substrate; and a plurality of pixel units disposed on the substrate, wherein each of the pixel units comprises:

a pixel electrode;

a first common electrode disposed apart from the pixel electrode, wherein an orthographic projection of the first common electrode on the substrate at least partially overlaps an orthographic projection of the pixel electrode on the substrate; and at least one second common electrode disposed in a layer in which the first common electrode is disposed, wherein an orthographic projection of the second common electrode on the substrate at least partially overlaps the orthographic projection of the pixel electrode on the substrate;

wherein the first common electrode and the second common electrode are insulated from each other;

wherein the first common electrode is formed into a mirror-symmetrical structure along a virtual plane perpendicular to the substrate, and the second common electrode is disposed outside the first common electrode;

wherein the plurality of pixel units are formed in a manner of intersecting a plurality of data lines with a plurality of scan lines, the number of the at least one second common electrodes is two, and the two second common electrodes are arranged on two sides of the first common electrode in an extension direction of the data lines;

wherein the opposed substrate and the array substrate are disposed apart from and opposite to each other, and the liquid crystal layer is disposed between the opposed substrate and the array substrate.

* * * * *